May 19, 1936.  F. R. BARCLAY  2,041,315
SAFETY TRAFFIC LIGHT FOR AUTOMOBILES
Filed Nov. 19, 1934
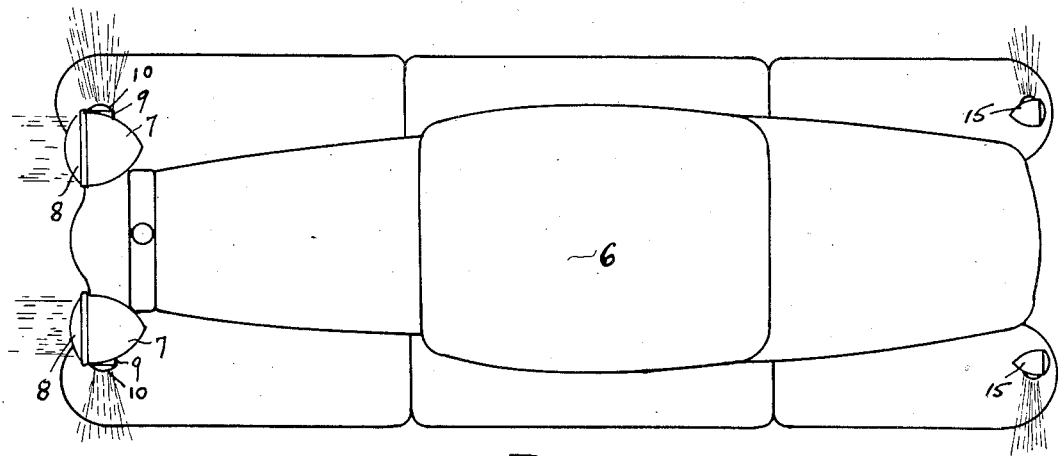
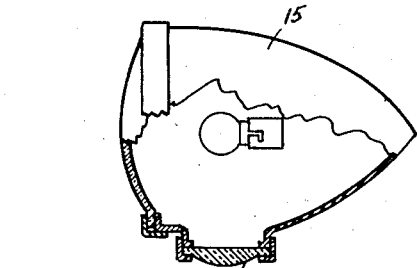
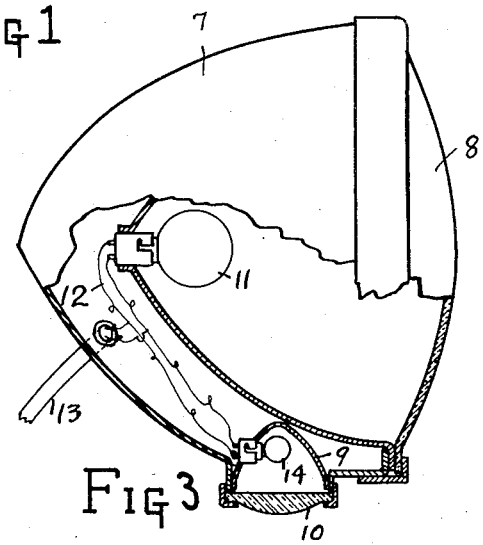
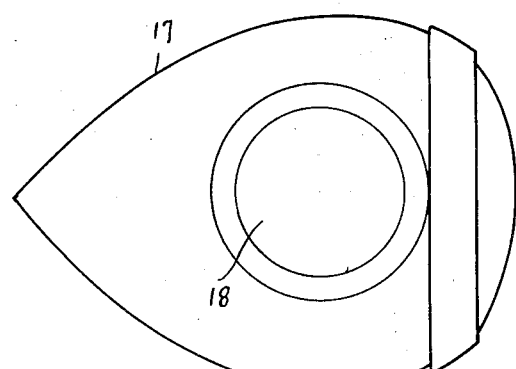
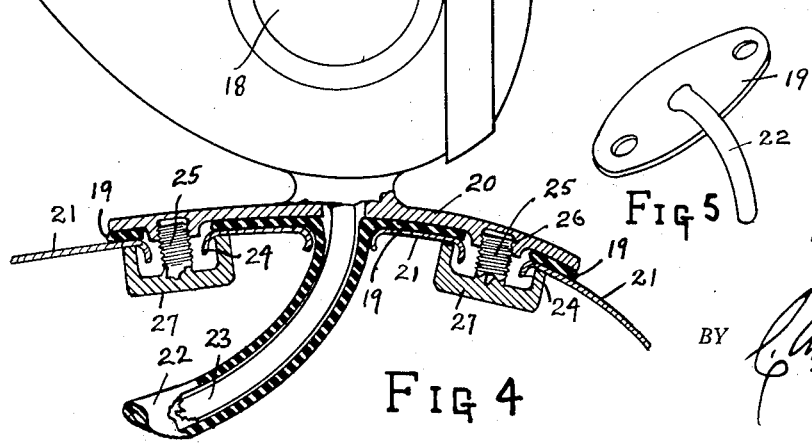
Frank R. Barclay
INVENTOR.
BY
ATTORNEY.

Patented May 19, 1936

2,041,315

UNITED STATES PATENT OFFICE 2,041,315

SAFETY TRAFFIC LIGHT FOR AUTOMOBILES

Frank R. Barclay, Youngstown, Ohio

Application November 19, 1934, Serial No. 753,635

2 Claims. (Cl. 248—204)

This invention relates to safety traffic lights for automobiles.

The principal object of this invention is to provide sidelights carried on the front and rear of an automobile in order to throw a warning ray of light so that the drivers of vehicles on the highway as well as those about to enter the highway may be apprised as to position and movement of the car carrying the sidelights. It is obvious that if the car carrying the sidelights should be about to enter the highway, either by driving out or backing out, the movement and position of the car would be made known to the drivers on the highway.

A further object is to provide safety by warning lights in making right and left turns on highways. With the safety lights which are to be hereinafter more fully described, it is clear that protection is afforded to the car carrying the lights as well as all other traffic and pedestrians.

A further object of the invention is to provide headlights with a sidelight acting on the same electric circuit as the headlight.

A further object is to provide a taillight with a sidelight acting upon the same electric circuit as the taillight.

A further object is to provide a light comprising a side warning light which may be mounted upon a fender of an automobile in such a manner as to reduce vibration and facilitate a quick and secure means of attaching.

A still further object is to provide an elastic moisture proof tube for carrying the electric wires for the electric light mounted upon the fender.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a top plan view of an automobile showing the side safety lights installed.

Figure 2 is a side elevation of a taillight with part broken away.

Figure 3 is a side elevation of a headlight with part broken away, showing side safety light.

Figure 4 shows the manner in which the safety light may be mounted upon a fender of an automobile.

Figure 5 is a perspective view of a resilient base for said safety light, together with a moisture proof tube for carrying the electric wires for the light.

By referring to the drawing it will be seen that there is provided an automobile 6 having mounted thereon headlights 7, each of which are provided with an ordinary front lens 8, and an auxiliary sidelight 9 carrying a colored lens 10.

By referring to Figure 3 it will be seen that the headlight 7 is provided with an ordinary light bulb 11 which is illuminated by means of electric wires 12 brought into the lamp through an elastic casing 13. It will also be seen that the electric wires 12 also contact a side warning light bulb 14. The auxiliary sidelights of the automobile are preferably under the switch control of the headlights so that it is not necessary to manipulate any other switches in the control of these lights.

By referring to Figures 1 and 2 it will be seen that there is provided a taillight 15 carrying a safety sidelight lens 16. It is understood that in the event that the automobile carries but one taillight, the light should be provided with oppositely disposed warning lenses in order to provide means of sending rays of light outwardly at right angles to the sides of the car.

By referring to Figure 4 it will be seen that there is provided a safety traffic light 17 provided with a side lens 18. In the mounting of this safety traffic light, there is provided a resilient base member 19, preferably formed of rubber. The resilient base member 19 is positioned between a foot 20 of the safety traffic light 17 and a fender 21. This resilient base member 19 is provided with an extended tube 22 for the purpose of encasing light wires 23 so that the same may be carried free from moisture. In the attaching of the safety traffic light 17, a pair of openings may be made by punching holes in the fender 21, driving the punch from the upper portion of the fender downwardly, thus leaving a down-turned flange portion 24. Lugs 25 are now turned into threaded recesses 26 from the under side of the foot 20. It will be seen that the lugs 25 are each provided with a recess head 27 in order to encase the downward flange portion 24, thus making it easy and inexpensive to install and at the same time securely holding the light 17 from any rotation.

What I claim is:—

1. In a safety traffic light to be mounted upon the fender of an automobile, a support for said light comprising a foot, a resilient base member positioned directly underneath said foot, an extended tube on said resilient base member for the purpose of encasing electric wires for said light, a pair of threaded recesses formed on under side of said foot, a pair of lugs passing through openings in a fender and through the resilient base member and into the threaded recesses of said foot.

2. In a safety traffic light to be mounted upon the fender of an automobile, a support for said light comprising a foot, a rubber base member positioned directly underneath said foot, an extended tube on said resilient base member for the purpose of encasing electric wires for said light, down-turned flanges formed by openings made in fender, a pair of threaded recesses formed on under side of said foot, a pair of lugs passing through openings in said fender and through the resilient base member and into the threaded recesses of said foot, a recessed head on each of said lugs for the purpose of encasing the down-turned flanges of said fender.

FRANK R. BARCLAY.